United States Patent [19]

Umphrey et al.

[11] 3,955,593

[45] May 11, 1976

[54] CONVEYOR FOR FLEXIBLE SLURRY HOSE

[75] Inventors: Ronald W. Umphrey; David L. McCain, both of Ponca City, Okla.

[73] Assignee: Continental Oil Company, Ponca City, Okla.

[22] Filed: Apr. 4, 1975

[21] Appl. No.: 565,183

Related U.S. Application Data

[63] Continuation of Ser. No. 463,222, April 23, 1974, abandoned.

[52] U.S. Cl. ............................ 137/344; 137/355.16; 302/14
[51] Int. Cl.² .................. B65H 75/34; B55G 53/30
[58] Field of Search .......... 137/344, 355.16, 355.17; 302/14; 192/12

[56] References Cited
UNITED STATES PATENTS 2,803,498  8/1957  Touton ............................... 137/344

*Primary Examiner*—Henry T. Klinksiek
*Attorney, Agent, or Firm*—William J. Miller

[57] ABSTRACT

A conveyor for a flexible slurry hose of the type carried on a plurality of wheel-supported carts interconnected by an articulated linkage. The conveyor provides guidance and track means for transporting the carts and hose through a 180° turn by lifting the wheels from the ground and guiding the linkage through the 180° turn. The hose linkage and carts are guided through portions of an elliptical path before and after passing through an arc of a circle facilitating greater ease in negotiation of the entire turn, and a lesser degree of lateral displacement of the linkage than in systems guiding through a 180° path of travel formed on a constant radius.

20 Claims, 9 Drawing Figures

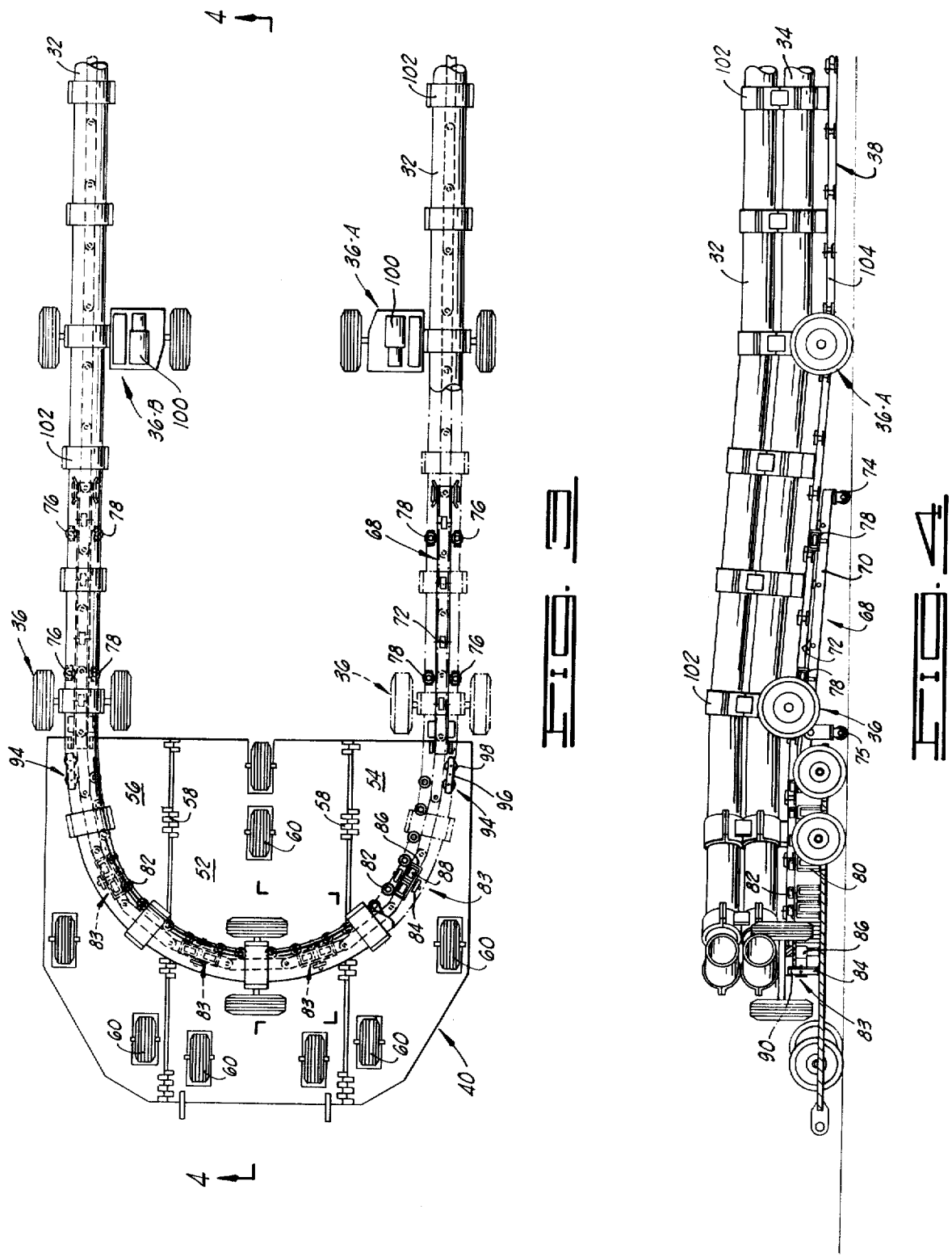

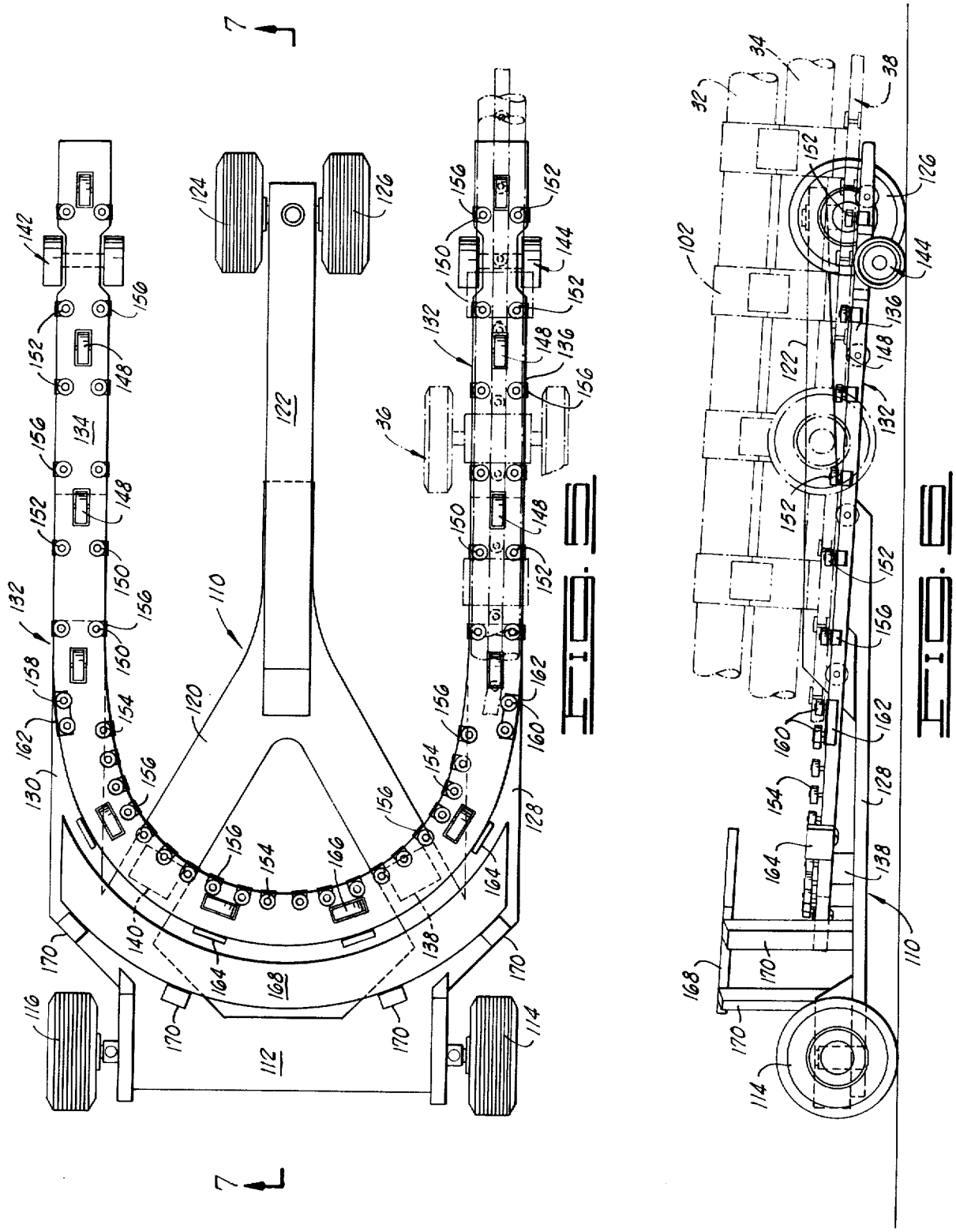

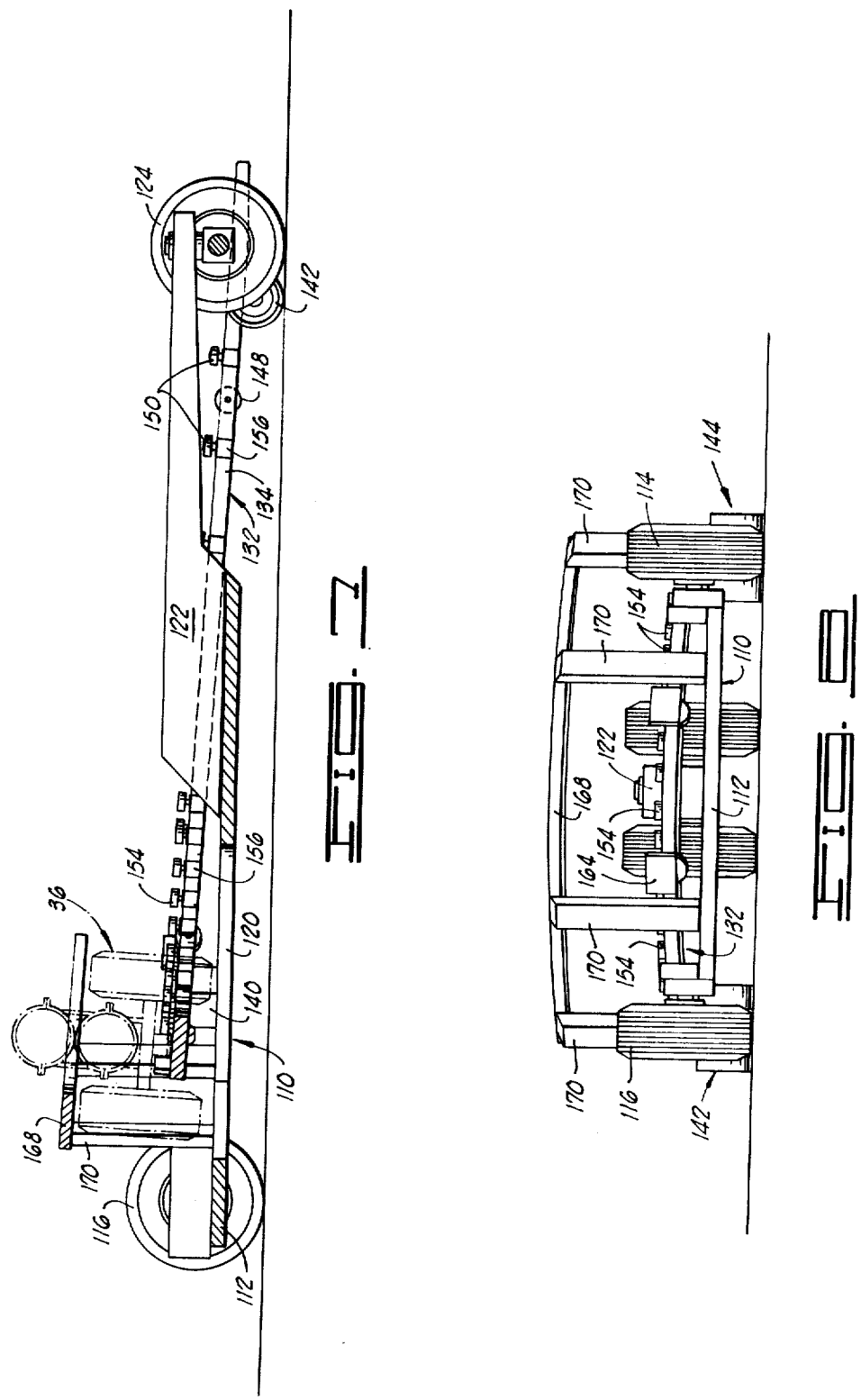

CONVEYOR FOR FLEXIBLE SLURRY HOSE

This is a continuation of application Ser. No. 463,222 of R. W. Umphreyn et at. filed Apr. 23, 1974, now abandoned.

REFERENCE TO RELATED APPLICATIONS AND PATENTS

Subject matter related to the subject matter of the present invention is contained in copending application Ser. No. 389,271, filed Aug. 21, 1973, now U.S. Pat. No. 3,868,964, entitled "Conveyor For Slurry Hose Transportation System", in application Ser. No. 297,113 entitled "Conveyor For Slurry Hose Transportation System" filed Oct. 12, 1972, now abandoned, in application Ser. No. 294,720, entitled "A Mobile Slurry Handling System" filed Oct. 3, 1972, now abandoned; in U.S. Pat. No. 3,845,990; and U.S. Pat. No. 3,886,965.

DISCUSSION OF THE PRIOR ART

U.S. Pat. No. 3,260,548 to Eric Reichl discloses a mining machine which is connected through a slurry hose system to a terminal which receives product via one of the hoses. The hoses are not supported off the floor of the mine and have a slightly greater length than the distance from the terminal to the coal digging machine, thus providing some slack allowing a short range of operation for the mining machine. Due to the dragging of the hoses on the mine floor, excessive wear occurs due to the great weight of the hoses when filled with slurry and the rough surface normally characteristic of the floors of mine passageways.

In the above-mentioned U.S. Pat. No. 3,868,964 an apparatus is disclosed for handling a flexible slurry pipe or hose which is connected between a terminal and a coal digging machine. The slurry handling system includes two hoses, one for transporting water or other liquid, and the second for transporting the slurry consisting of a mixture of the mined material and water. The pair of hoses is carried on a plurality of spaced carts which support the hoses above the mine floor and provide mobility to the hoses. The carts are selectively controlled in their movement so that the hoses follow movements of the coal digging machine in the mine. In order to accommodate extension of the hoses to a greater overall length, a portion of the hoses is stored in a horizontal bight to provide the necessary slack to facilitate operation of the coal digging machine over a suitable range or distance. In order to permit the stored portion of the hoses to be moved to an active position by reduction of the size of the bight, a conveyor system is provided which conveys and guides the hoses through a 180° loop.

Between the wheeled carts, the hoses are supported upon and clamped to an elongated, articulated linkage designed to limit the loop or turn through which the hoses pass to a minimum radius, thereby avoiding damage to, or failure of, the hose due to excessive bending. In traversing the 180° turn by movement upon the conveyor system, the hoses, supporting linkage and carts are lifted so that the wheels of the carts are off the mine floor. Movement of the hose system, articulated linkage and carts into and through the turn is accomplished by powering certain of the supporting carts which are disposed in an active portion of the slurry transport system. When the carts and a portion of the hose supported thereon are returned to inactive storage, the powered carts are deactivated. The 180° conveyor system is mobile and is powered so that it can accommodate changes in the geometry of the bight portions of the hoses as parts of the hoses are removed from or passed into storage.

BASIC DESCRIPTION OF THE INVENTION

This invention relates to a method and apparatus for conveying the hoses and supporting carts through a 180° turn to facilitate storage of the hoses, and to enable them to be paid out, increasing their overall length between the mining location and terminal. The conveyor system includes a mobile framework having an arcuate ramp supported thereon. Linkage guiding elements are mounted on the ramp for guiding the linkage which interconnects the carts and supports the hoses as both traverse the loop. The ramp and guiding elements are configured to steer the carts, the interconnecting linkage and the hoses supported thereon initially into a segment of an elliptical path of increasing curvature, then through a path of constant radius, and finally through an elliptical path of decreasing curvature. Mobility is provided to the conveyor so that it can accommodate changes in the length of the slurry hose in storage.

BRIEF DESCRIPTION OF THE ADVANTAGES OF THIS INVENTION

This invention provides a method and apparatus for moving a hose train consisting of a plurality of wheel supported carts connected by a linkage and carrying a pair of large diameter hoses of limited flexibility, through a 180° turn without overstressing the hoses by stretching, excessive flexing or buckling, and without undesirable lateral flexing of the links in the linkage. The conveyor system of the invention is constructed to assure continuous and accurate tracking of the hose train linkage upon guiding rollers of the conveyor system. The conveyor is mobile and is thereby enabled to follow the lengthening or shortening of the hose train as the bight therein, providing reserve storage, is enlarged or decreased in size.

BRIEF DESCRIPTION OF THE DRAWINGS

FIG. 3 is a top view of the conveyor illustrated in FIG. 2;

FIG. 4 is a sectional view of the conveyor shown in FIG. 3 taken along line 4—4 of FIG. 3;

FIG. 5 is a top plan view of the conveyor illustrating an alternate embodiment of this invention;

FIG. 6 is a side elevation view of the conveyor illustrated in FIG. 5;

FIG. 7 is a sectional view of the conveyor illustrated in FIG. 6 taken along line 7—7 of FIG. 5;

FIG. 8 is a front elevation view of the conveyor illustrated in FIG. 5;

FIG. 9 is a diagram illustrating the geometry utilized in constructing the conveyor of the invention.

Referring to FIG. 1, a mining machine 10 produces particulate product 12 which is transferred by a conveyor 14 to a crusher 16. The material from the crusher 16 is dropped or conveyed into a hopper 18 which contains water. A water level control 20 applies a continuous signal through line 22 to a valve 24 which terminates water line 26. Water line 28 is connected to valve 24 and through a plurality of slots (not shown) communicates with the interior of the hopper.

Figure 1:
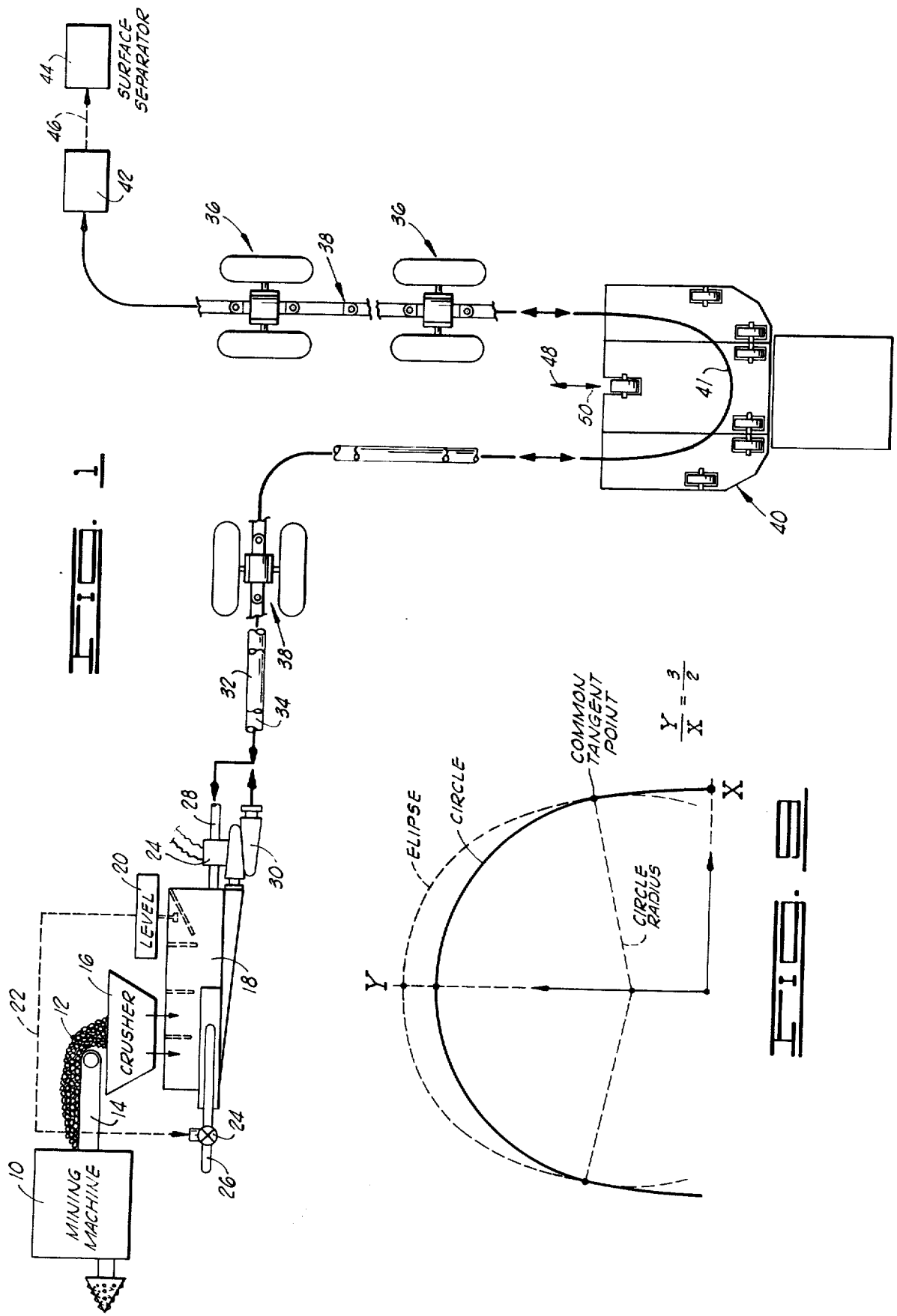
FIG. 1 is a schematic illustration of a slurry hose transportation system which includes the conveyor of the present invention.
Figure 2:
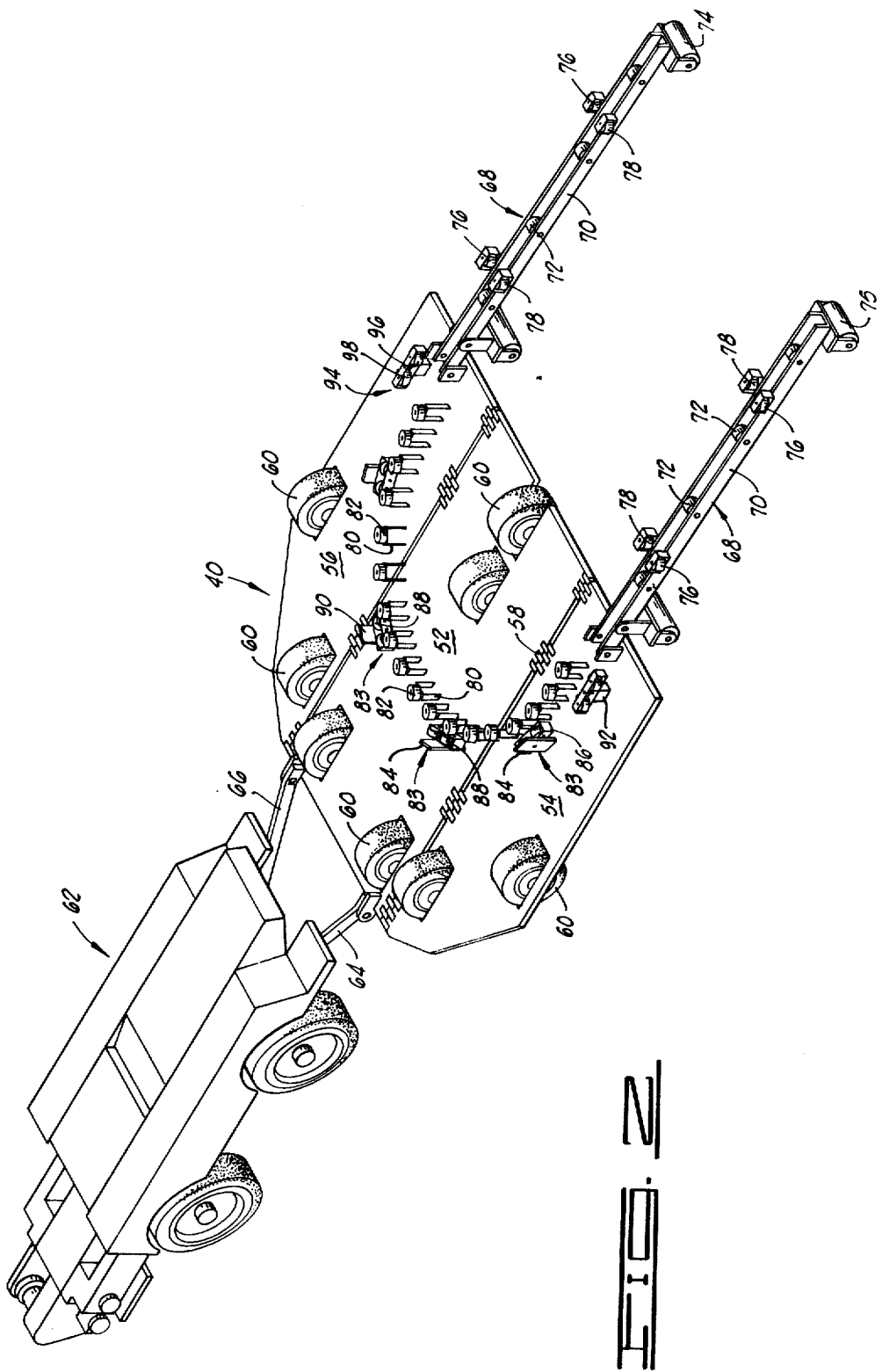
FIG. 2 is a perspective view of one embodiment of this invention.

A slurry pump 30 has its inlet connected to the outlet of the hopper 18 and pumps slurry into a slurry hose 32. Another hose 34 is connected to water line 28. Both hoses are supported on a transportation system which includes carts 36 connected by articulated linkage 38. The various links of linkage 38 are pivotally interconnected for movement in a horizontal plane. The linkage acts as a beam in a vertical plane. A conveyor 40 controls the movement of the carts, linkage and hoses through a bight 41 encompassing a 180° turn. The hoses terminate at a stationary remote terminal 42. A surface separator 44 may be connected to the terminal 42 through any known system 46, such as a pipeline.

In operation, product 12 removed by the mining machine 10 is passed through crusher 16 and the subparticles thus formed are deposited in hopper 18. The pump 30 transfers the slurry from the hopper into hose 32 through which it is transmitted to the terminal 42. From the terminal, the slurry is pumped to the surface and separated by separator 44. As the mining machine 10 works in and out of the coal seam, the slurry hoses 32 and 34 must follow these movements. To facilitate this movement, the portion of the bight 41 of the hoses between the conveyor 40 and the terminal 42 functions as a reserve or storage section. As additional hose is needed to accommodate movement of the mining machine, conveyor 40 will move in the direction of arrow 48, shortening the storage spans of the hoses and providing additional hose which can progress into the mine passageway immediately behind the advancing mining machine. In accomplishing this transition and the effective foreshortening or reduction of the bight of the hoses extending around the conveyor 40, some of the carts 36 and linkage 38 which interconnects them, as well as the hoses 32 and 34 carried thereon, must move through the 180° turn from a storage position on the remote or terminal side of the turn, to an active position on the mining machine side of the turn. The conveyor 40 facilitates this movement of carts, linkage and hoses by lifting the carts, concurrently with guiding the interconnecting linkage and the hoses carried thereby, simultaneously with the movement of the conveyor in the direction of the arrow 48. The same functions are performed by the conveyor in an inverse sense when the conveyor moves in the direction of the arrow 50 where the size of the bight in the hoses is to be increased, and the amount of each hose in storage is increased.

DETAILED DESCRIPTION OF 180° CONVEYOR

Two embodiments of the 180° conveyor 40 as illustrated in FIG. 1 are illustrated in FIGS. 2–4 and FIGS. 5–8. In the embodiment shown in FIGS. 2–4, the conveyor 40 includes a center platform section 52, a first side platform section 54 and a second side platform section 56. The platform sections are interconnected by hinges 58 to make a unitary supporting structure. A plurality of wheels 60 are mounted in each of the platform sections 52, 54 and 56 to mobilize and support the conveyor off the mine floor. A tractor 62 is connected through arms 64 and 66 to platform section 52.

Ramps 68 are connected to the rear side of the platform sections 54 and 56 near the outer edges thereof and provide a structure for elevating the carts 36 from the mine floor preparatory to traversing the 180° turn. Each of the ramps 68 includes a channel 70 carrying a plurality of rollers 72 rotatable about a horizontal axis, and projecting above the upper surface of the channel. Each ramp 68 is supported on supporting rollers 74 and 75 positioned to rollably contact the floor of the mine. Each ramp 68 also carries a plurality of bracket supported outside guide rollers 76 mounted for rotation about a generally vertical axis, and a plurality of bracket supported inside guide rollers 78 similarly mounted on the opposite sides of the channel of each ramp.

Mounted on a plurality of vertically extending brackets 80 secured to the upper side of the platform sections 52, 54 and 56 are inner race guide rollers 82. The brackets 80 and guide rollers 82 are arranged on the platform sections 52, 54 and 56 in a particular geometric array which can be described as a segment of a circle (formed on a constant radius) having a pair of elliptical segments of increasing radius of curvature joining the ends of the circle segment. This geometric array of the guide rollers 82 will be hereinafter explained in detail.

For the purpose of providing vertical support to the hose system as it traverses the 180° turn, a plurality of spaced horizontal bogie roller structures 83 are mounted on the upper side of the platform sections 52, 54 and 56, and each includes spaced posts 84 which pivotally support a bracket 86 rotatably carrying a pair of spaced bogie rollers 88. Each of the posts 84 located at the outside of the turn also carries an upwardly projecting guide plate 90 to aid in guiding the hose assembly through the turn in a manner hereinafter explained. There are also provided on opposite sides of the supporting structure constituted by the platform sections 52, 54 and 56, a pair of upwardly extending supporting posts 92 which support at their upper ends, a pair of outer race bogie roller structures 94. Each of the bogie structures 94 includes a bracket 96 pivotally mounted on the post 92 for pivotation about a vertical axis, and a pair of spaced rollers 98 rotatably supported in the bracket for rotation about vertical axes.

THE HOSE SUPPORTING AND HAULING SYSTEM

Referring next to the hose supporting and hauling system adapted to support the hoses and facilitate traverse of the conveyor, certain of the carts 36 spaced along the length of the hoses may be powered to facilitate movement of the hoses with others of the carts unpowered. Thus, as depicted in FIG. 3, the carts 36-a and 36-b there illustrated are powered carts driven by electric motors 100 carried on the carts and driving the carts through a hydraulic system, all as referred to in greater detail in U.S. Pat. No. 3,830,325. Both the powered and unpowered carts carry hose clamps 102 suitable for rigidly holding the hoses in superimposed position over the carts. Interconnecting the carts 36 and further facilitating the support of the hoses 32 and 34 is the articulated linkage 38, which linkage, in the present invention, includes a plurality of relatively short, pivotally interconnected links 104. The links 104 are preferably less than about 22 inches in length, and are most suitably made about 19 inches in length. The links are pivotally connected for pivotation relative to each other about vertical axes, but act as a rigid beam resisting bending of the linkage in the vertical plane. The links 104 are rectangular in cross-section and are of sufficient thickness and width to permit the rollers 98 of the outer race bogie roller structures to guide thereon, as well as the inner race guide rollers 82 and the supporting bogie rollers 88 of the horizontal bogie roller structures. Defining a span of the hose system as the distance between two adjacent carts in the system, a pair of hose clamps 102 are provided between each pair of adjacent carts, or, stated differently, the hose system includes three hose clamps and six links per span. Every other link 104 has one of the clamps 102 carried thereon.

In FIGS. 5–8, another embodiment of the conveyor 40 is illustrated, and includes a subframe 110 having a forward, transversely extending platform 112 which projects between a pair of steerable forward wheels 114 and 116. The platform 112 is connected through a suitable tongue or hitch (not shown) to a tractor or synchronously controlled pulley or sheave system (not shown) to facilitate reciprocating movement of the conveyor in the manner hereinbefore described. The subframe 110 further includes a bifurcated central frame member 120 which projects rearwardly from the platform 112. A beam 122 is supported at its free rearward end by a pair of wheels 124 and 126, and is secured at its forward end to the upper side of the central frame member 120. The wheels 124 and 126 engage the floor of the mine, and the wheel assembly and rear end of the beam 122 are preferably weighted, or in some way restrained or restricted against lateral movement in a direction perpendicular to the axis of the beam 122 for a purpose hereinafter described. The subframe 110 further includes a pair of substantially parallel side arms 128 and 130 which arms project rearwardly from the platform 112 on opposite sides of the central frame member.

A generally U-shaped ramp, designated generally by reference numeral 132, is mounted on the upper side of the subframe 110. The ramp 132 includes a pair of elongated, substantially parallel legs 134 and 136. The legs 134 and 136 are interconnected through a curvilinear portion of the ramp which, as will be hereinafter explained, includes a pair of sectors of an ellipse (of changing radius of curvature) disposed at opposite ends of a portion of constant radius of curvature constituting a segment of a circle. The ramp 132 is supported on the side arms 128 and 130 at their outer ends, and is also supported upon posts 138 and 140 which extend downwardly to the arms of the bifurcated central frame member 120. It should be here noted that, instead of the described configuration characterizing the ramp 132, it may merely include straight linear approaches intersecting the ends of the circle segment, with the desired elliptical segments of the guided path of movement of the hose train being provided by the arrangement of guide rollers as hereinafter described.

The ramp 132 is preferably a tubular member of rectangular cross-section, and has the legs 134 and 136 supported near the free rearward end thereof by roller pairs 142 and 144, or alternatively, on skids. The free rearward ends of the ramp legs 134 and 136 are carried at a vertical level above the mine floor which is lower than the vertical clearance beneath the chassis of the several carts 36 provided in the hose system so that these carts may straddle and move over the arms 134 and 136 in approaching and in leaving the ramp 132. The upper side of the ramp 132 is slotted at horizontally spaced intervals therealong to receive supporting rollers 148 which are rotatably mounted in the ramp, and function to support the linkage 38 of the hose system in a manner hereinafter described. There are also provided on opposite sides of the arms 134 and 136 of the ramp 132, lateral guide rollers 150 and 152 which track on and guide the linkage 38 as the hose system rides up on the ramp 132.

Mounted on opposite sides of the ramp 132 are a series of guide rollers which function to guide and steer the hose system through the turn provided by the conveyor. The guide rollers include inner race rollers 154 supported on suitable brackets 156 at the inner or concave side of the ramp 132, and two pairs of outer race rollers 158 and 160 mounted on suitable brackets 162 and located at the entrance to the elliptical sectors constituting the first portions of the curvilinear part of the path. Spaced retainer plates 164 are secured to the outside of the curved portion of the ramp, and project upwardly to a level above the upper surface of the ramp. Additional weight bearing rollers 166 are mounted in the upper side of the ramp at spaced intervals around the curvilinear portion thereof. For the purpose of preventing the hose train from being pulled upwardly and rearwardly off the track constituted by the ramp 132, an arcuate hold down plate 168 is mounted by posts 170 on the forward portion of the subframe 110 at a location such that the retainer plate extends concentrically with respect to the circular portion of the ramp 132. Hold down plate 168 acts as a stop or movement limiting member restraining upward movement of the outer wheels carried by the carts 36 as the carts traverse the curved portion of the ramp.

The embodiment of the conveyor depicted in FIGS. 5–8 functions substantially identically to the embodiment illustrated in FIGS. 1–4 and hereinbefore described. Thus, a bight or loop in the hose system rides over, and is guided by, the conveyor 40. The hose system moves relatively to the conveyor, and the conveyor may reciprocate to accommodate changes in the size of the bight in the hose system, or stated differently, to accommodate the paying out or taking in of a portion of the hose train as may be needed to accommodate movements of the mining machine. As movement of the hose train occurs, the articulated linkage 38 moves into contact with the ramp 132, and the weight of the hose train on the conveyor is supported by the various weight bearing rollers 148 and 166. The hose train is always in tension during movement, and such tensioning assures that the sides of the links 104 making up the articulated linkage 38 will bear against, and track on, the inner race rollers 154 mounted on the inside of the arcuate portion of the ramp 132. The relatively short dimension of the links 104, in conjunction with the relatively close spacing of the clamps 102 by which the superimposed hoses are clamped to the supporting linkage, assures that the hose train will conform to and follow the curved path defined by the inner race guide rollers 154.

Since there may, at times, be a very large force acting on the hose train tending to shorten the bight and pull the hoses, linkage and associated carts off the conveyor by exerting an upward force component thereon, the hold down plate 168 is provided to assure that upward movement of the train in this fashion is restrained by contact of the outer wheels of one or more carts 36 with the underside of this restraining plate. At most times during the operation of the conveyor and the movement of the hose system relative thereto, the portion of the hose train forming one side of the bight may be more greatly tensioned than the portion forming the other side. This unequal distribution of forces along the train exerts a lateral force on the conveyor, causing a tendency to yaw or fishtail as the conveyor is reciprocated to accommodate movements of the train. To compensate for this tendency, the wheels 114 and 116 of the conveyor are made steerable, and the rear, free end of the beam 122 and the wheels 124 and 126 are heavily loaded to provide maximum frictional engagement with the mine floor, or a retaining track or similar structure is provided to prevent lateral movement of these wheels with respect to the mine floor.

THE GEOMETRY OF THE CONVEYOR AND LINKAGE

As has been previously indicated, the inner race guide rollers 154 are arrayed on the supporting platform sections in a curvilinear pattern which provides a guide path for the hose system, which path includes a segment of a circle intersecting at its ends, segments of an ellipse. At each point of intersection between the circle segment and an ellipse segment, the ellipse and the circle have a common tangent. In forming the 180° turn of the geometry described, the major and minor axes of the ellipse are preferably dimensioned in a 3:2 ratio. Further, in a system constructed in accordance with the preferred embodiment, the major axis of the ellipse is preferably 162 inches long and the minor axis is 108 inches long. The segment of the circle which intersects the two ellipse segments then has a radius of 51.029 inches. The center of curvature of the circle segment is displaced 19.75 inches from the center of the ellipse containing the two segments at the entry to, and exit from the 180° turn. The geometric figure defined by the preferred dimensions and shapes described is illustrated in FIG. 9 of the drawings.

In the preferred embodiment of this invention, the hoses 32 and 34 are each approximately 1 foot in outside diameter. Each hose is made of rubber reinforced with steel, and this construction limits to some extent the flexibility of the hose. The hoses must not be bent into a curvature whereby buckling of the hose occurs. Preferably, the minimum radius of curvature through which the hoses are bent is not less than about five feet, as measured to the outside of the hoses in the bend. More recent hose types permit some reduction in this minimum radius of curvature. The geometry of the guide roller array described above does not violate this restriction, and the use of relative short links 104 in the linkage 38, together with the provision of the clamps 102 spaced at about every three feet along the hoses assures adequate support for the hoses, and retention thereof in an arc which will conform to the turning radius afforded by the inner race guide rollers 82. The provision of the two elliptical segment approaches to the circle segment, in conjunction with the short links, also assures that no excessive pivotation of the ends of the links in a lateral sense (or outwardly with respect to the path being followed by the hoses) will occur as the hose system initially commences to undergo bending in traversing the turn. The short links also function, in conjunction with the relatively short distance between hose clamps, to prevent the development of undesirable torsion forces in the length of hoses due to dip or vertical displacement of the hoses between points of support afforded by the spaced horizontal bogie roller structures 83.

Although certain preferred embodiments of the invention have been herein described, it will be understood that various structural changes can be effected in the depicted and described structures without departure from the basic principles of the invention. For example, instead of mobilizing the hose train by powering certain of the carts 36, a towing tractor can be provided at the leading end of the hose train in combination with a tractor or suitable powered system for moving the conveyor to enlarge the bight in the hose train, or both powered carts and a tractor at the leading end of the hose train can be used in combination. Such changes are therefore deemed to be comprehended within the spirit and scope of the invention except as the same may be limited by the appended claims or reasonable equivalents thereof.

What is claimed is:

1. In a system for transporting a slurry from a mining machine in a mine having a floor and which includes at least one flexible hose supported by a plurality of spaced, wheeled carts, and further supported by a flexible linkage interconnecting the carts, which system further includes a mobile conveyor movably supporting some of the carts off the floor and a 180° bend in the hose and linkage, and located between the storage section and a parallelly located active section as the need for the hose changes, the improvement comprising:
    means on said conveyor for guiding the linkage and hose supported thereon through a curving path defining said bend of 180°, which curving path includes a first portion having a radius of curvature which continually diminishes and a second portion having a radius of curvature which continually increases to complete said curving path.

2. The improvement defined in claim 1 wherein said curving path defines an elliptic curve with the point of joinder of said first portion and said second portion being a radius transition point.

3. The improvement defined in claim 1 wherein said conveyor further includes:
    a subframe; and
    a generally U-shaped ramp mounted on said subframe and having said guiding means mounted thereon.

4. An improvement as defined in claim 1 additionally including a third curved portion positioned between said first and second portions.

5. The improvement defined in claim 4 wherein said first and second curving path portions are segments of an ellipse in which the major axis - minor axis ratio is 3:2.

6. The improvement defined in claim 4 wherein the radius of said curving path third portion plus the radius of the smallest of said hoses is at least 5 feet.

7. The improvement defined in claim 1 wherein said conveyor is further characterized to include:
    a platform;
    load bearing rollers mounted on the platform and supporting the weight of the hose, linkage and carts supported on the conveyor; and wherein said guiding means comprises a plurality of inner race guide rollers mounted on the platform and positioned to bear against said linkage and guide said linkage through the defined curving path.

8. The improvement defined in claim 7 wherein said load bearing rollers are positioned to gradually elevate said linkage, hose and carts through a gradient to a point where the wheels of the cart are spaced above said platform as said inner race rollers contact said linkage, and said linkage is supported at an elevation to track on said inner race rollers in traversing said curving path.

9. The improvement defined in claim 7 wherein said load bearing rollers include a plurality of bogied rollers.

10. The improvement defined in claim 2 and further characterized as including:

a pair of inclined, parallel ramps connected to, and extending from, the platform; and rollers rotatably mounted at the upper side of each of said ramps for rollably supporting said linkage as said linkage, carts and hoses move to or from a position over said platform, and for guiding said linkage to a position of horizontal alignment with said guiding means to facilitate tracking of said linkage on said guiding means.

11. The improvement defined in claim 3 wherein said ramp is inclined and includes a pair of substantially parallel legs having their free ends at the lowest portion of the ramp, and wherein said improvement is further characterized as including a plurality of load bearing rollers mounted on the upper side of said ramp for contacting said linkage and retaining the linkage in a position to track on said guiding means.

12. The improvement defined in claim 3 and further characterized as including a hold down plate mounted on said subframe and including a portion positioned for passage of a part of each of said carts therebeneath as the respective carts move through said curving path whereby said carts, hoses and linkage are restrained from moving upwardly relative to said subframe and ramp.

13. The improvement defined in claim 3 wherein said guiding means comprises a plurality of spaced inner race guide rollers mounted on said ramp and positioned to bear against said linkage and guide said linkage through the defined curving path.

14. The improvement defined in claim 3 and further characterized as including a pair of steerable wheels mounted on said subframe for steering the conveyor as said conveyor is moved by said moving means; and means on said subframe for preventing yawing and fishtailing of the subframe as said conveyor is moved by said moving means.

15. The improvement defined in claim 3 wherein said U-shaped ramp includes a portion conformed in shape to said defined curving path.

16. The improvement defined in claim 3 wherein said U-shaped ramp is a tube of rectangular cross-sectional configuration.

17. The improvement defined in claim 3 wherein said curving path first and second portions are segments of an ellipse in which the major axis-minor axis ratio is 3:2.

18. The improvement defined in claim 13 wherein said U-shaped ramp includes a portion conformed in shape to said defined curving path.

19. The improvement defined in claim 18 wherein said ellipse segments are segments of an ellipse in which the major axis - minor axis ratio is 3:2.

20. The improvement defined in claim 19 wherein said curving path first and second portions are segments of an ellipse in which the major axis-minor axis ratio is 3:2.

* * * * *